US012771405B2

(12) United States Patent
Gu et al.

(10) Patent No.: US 12,771,405 B2
(45) Date of Patent: Oct. 20, 2026

(54) DEVICES AND METHODS FOR WIRELESS POWER HARVESTING AND BACKSCATTERING COMMUNICATIONS

(71) Applicants: Huawei Technologies Canada Co., Ltd., Kanata (CA); La corporation de l' École Polytechnique de Montréal, Montréal (CA)

(72) Inventors: Xiaoqiang Gu, Bristol (GB); Ke Wu, Saint-Laurent (CA)

(73) Assignees: Huawei Technologies Canada Co., Ltd., Kanata (CA); La corporation de l' École Polytechnique de Montréal, Montreal (CA)

( * ) Notice: Subject to any disclaimer, the term of this patent is extended or adjusted under 35 U.S.C. 154(b) by 180 days.

(21) Appl. No.: 18/749,835

(22) Filed: Jun. 21, 2024

(65) Prior Publication Data

US 2025/0392351 A1 Dec. 25, 2025

(51) Int. Cl.
*H04B 5/79* (2024.01)
*H02J 50/10* (2016.01)
*H02J 50/20* (2016.01)

(52) U.S. Cl.
CPC ................ *H04B 5/79* (2024.01); *H02J 50/10* (2016.02); *H02J 50/20* (2016.02)

(58) Field of Classification Search
CPC .............. H04B 5/79; H02J 50/10; H02J 50/20
See application file for complete search history.

(56) References Cited

U.S. PATENT DOCUMENTS

| | | | | |
|---|---|---|---|---|
| 10,033,424 B2 | 7/2018 | Gollakota et al. | | |
| 10,079,616 B2 | 9/2018 | Reynolds et al. | | |
| 10,447,331 B2 | 10/2019 | Gollakota et al. | | |
| 10,498,569 B2 | 12/2019 | Ganesan et al. | | |
| 11,411,597 B2 | 8/2022 | Reynolds et al. | | |
| 2011/0115303 A1* | 5/2011 | Baarman | H04B 5/79 307/104 | |
| 2018/0131411 A1* | 5/2018 | Floresca | H04B 5/45 | |
| 2020/0266673 A1* | 8/2020 | Reynolds | H02J 50/20 | |
| 2022/0077886 A1 | 3/2022 | Yan et al. | | |

* cited by examiner

*Primary Examiner* — Jeffrey M Shin
(74) *Attorney, Agent, or Firm* — Tim Tingkang Xia, Esq.; Troutman Pepper Locke LLP

(57) ABSTRACT

The present application provides devices and methods for wireless power harvesting (WPH) and backscattering communications. A self-adaptive backscattering device is described which comprises an antenna for receiving and transmitting radio frequency (RF) signals, a non-linear element coupled to the antenna, and a switch for operably coupling the non-linear element to a WPH load. When the switch is on, the non-linear element is connected to the WPH load for harvesting RF signals incident on the antenna to direct current (DC) energy in a WPH mode; when the switch is off, the device switches from the WPH mode to a harmonic backscattering (HB) mode for transmitting harmonic backscattered RF signals through the antenna, and the switch self-adaptively switches between on and off based on harvested DC energy. The described embodiments can be a compact solution suitable for wireless communications in the internet of things (IoT) and wireless sensor network (WSN).

18 Claims, 9 Drawing Sheets

DEVICES AND METHODS FOR WIRELESS POWER HARVESTING AND BACKSCATTERING COMMUNICATIONS

FIELD OF THE DISCLOSURE

The present disclosure relates generally to devices and methods for providing wireless power harvesting (WPH) and backscattering communications, and in particular to devices and methods for providing WPH and harmonic backscattering (HB) communications.

BACKGROUND

Simultaneous Wireless Information and Power Transfer (SWIPT) transceivers are poised to play a significant role in the Internet of Things (IOT) and Wireless Sensor Network (WSN) applications. To be compatible with SWIPT transceivers and be able to interrogate them, scattered IoT and WSN devices are designed as a receiver and a transmitter at the same time. Backscattering technology draws vast attention and interest as it reflects incoming radio frequency (RF) signals from SWIPT transmitters for communications instead of re-generating them, significantly saving energy. A self-sustainable backscattering device may be possible by drawing power from incident RF signals from SWIPT transceivers and reflecting backscattered signals.

SUMMARY

According to one aspect of this disclosure, there is provided a self-adaptive backscattering device, comprising an antenna for receiving and transmitting radio frequency (RF) signals; a non-linear element coupled to the antenna; and a switch for operably coupling the non-linear element to a wireless power harvesting (WPH) load, wherein when the switch is on, the non-linear element is connected to the WPH load for harvesting RF signals incident on the antenna to direct current (DC) energy in a WPH mode; when the switch is off, the device switches from the WPH mode to a harmonic backscattering (HB) mode for transmitting harmonic backscattered RF signals through the antenna, and the switch self-adaptively switches between on and off based on harvested DC energy.

In some implementations, the switch is switched off when the harvested DC energy in the WPH mode increases to a first level; and the switch is switched on when the harvested DC energy decreases to a second level, wherein the first level corresponds to a logic high bias of the switch; and the second level corresponds to a logic low bias of the switch.

In some implementations, the device further comprises an energy storage for storing the harvested DC energy; and at least one sensor powered by the energy storage for generating sensor information.

In some implementations, at least one sensor starts functioning when the harvested DC energy in the WPH mode reaches a sensor threshold; the sensor is adapted to convert the sensor information into high and low bias voltages to switch off and on the switch; and the antenna is adapted to transmit the harmonic backscattered RF signals carrying the sensor information.

In some implementations, the sensor information is converted into high and low bias voltage using ON-OFF Keying (OOK) modulation.

In some implementations, the device further comprises an input matching network and an output matching network, wherein the input matching network is adapted to maximize input power transfer of the incident RF signals at $f_0$, the output matching network is adapted to maximize output power transfer to the harmonic backscattered RF signals of $2f_0$ in the HB mode.

In some implementations, the device further comprises two quarter-wavelength stubs each connected to an end of the non-linear element for filtering and maximizing harmonic backscattering of the incident RF signals, wherein the two quarter-wavelength stubs can help the non-linear element maximize its conversion from incident RF signals of $f_0$ to the harmonic backscattered RF signal of $2f_0$.

In some implementations, the device further comprises a filtering capacitance connected to the WPH load for grounding fundamental and higher harmonic RF signals in the WPH mode.

In some implementations, the non-linear element comprises a single Schottky diode.

In some implementations, the switch is a Single Pole, Single Throw (SPST) switch and the device initially operates in the WPH mode.

According to another aspect of this disclosure, there is a self-adaptive method of wireless power harvesting (WPH) and harmonic backscattering (HB), comprising receiving radio-frequency (RF) signals from a transceiver; converting the RF signals into direct current (DC) power in a WPH mode via a non-linear element; and automatically switching from the WPH mode to a HB mode for generating harmonic backscattered RF signals via the non-linear element, based on the converted DC energy.

In some implementations, the transceiver is a simultaneous Wireless Information and Power Transfer (SWIPT) transmitter.

In some implementations, wherein said automatically switching from the WPH mode to the HB mode comprises automatically switching from the WPH mode to the HB mode when the converted DC energy increases to a first level; and the method further comprises automatically switching from the HB mode to the WPH mode when the converted DC energy decreases to a second level, wherein the first level corresponds to a logic high bias of the switch; and the second level corresponds to a logic low bias of the switch.

In some implementations, the method further comprises turning on a sensor when the converted DC energy reaches a first threshold for generating sensor information.

In some implementations, the method further comprises converting the sensor information into high and low bias voltages for switching off and on the switch; and transmitting the harmonic backscattered RF signals carrying the sensor information.

In some implementations, the sensor information is converted using ON-OFF Keying (OOK) modulation.

In some implementations, said generating harmonic backscattered RF signals comprises upconverting and maximizing incident RF signals of $f_0$ into second harmonic backscattered components of $2f_0$ using the non-linear element and two quarter-wavelength stubs.

In some implementations, the method further comprises accumulating the harvested DC energy in an energy storage.

In some implementations, the RF signals are received in response to a request from a portable device; and the harmonic backscattered RF signals are transmitted to the portable device.

In some implementations, the switch is on by default to connect to a WPH load for initially operating in the WPH mode.

The various implementations disclosed herein provide a solution suitable for self-adaptive devices, methods, circuits and systems for WPH and backscattering communications, particularly WPH and HB communications.

By realizing WPH and backscattering functions using a shared nonlinear element, the system design can be simplified, efficiency increased, and the device's energy consumption reduced. Various of the embodiments of the described devices and methods adopt harmonic backscattering technology, which can reduce interference introduced by self-jamming. The various implementations disclosed herein provide self-adaptive and battery-free operations enabled only or otherwise substantially by incoming RF signals. Sensor information can be transmitted through the backscattering signals. The compact designs of the devices, methods, circuits and systems make them a cost-effective and energy efficient solution in many applications of WPH and HB communications, including but not limited to IoT and WSN applications.

BRIEF DESCRIPTION OF THE DRAWINGS

These and other features of the disclosure will become more apparent from the description in which reference is made to the following appended drawings.

DETAILED DESCRIPTION

Embodiments disclosed herein relate to devices, methods, circuits and systems of providing wireless power harvesting (WPH) and backscattering communications, particularly harmonic backscattering (HB) communications. The described embodiments of devices, methods, circuits and systems can be suitable for use in wireless communications using radio frequency (RF) signals, including but not limited to Internet of Things (IoT) and Wireless Sensor Network (WSN) applications. Examples of the RF signals include but are not limited to digital television broadcasting, Global System for Mobile communication (GSM™), Long Term Evolution (LTE™), Wi-Fi™ signals, Bluetooth™, and the like.

For purposes of this disclosure, WPH refers to devices, methods, circuits and/or systems that can receive RF signals and convert them into direct current (DC) energy or power. The converted DC energy or power can be used to drive various parts of the system or circuit, including for example, one or more sensors.

Backscattering refers to devices, methods, circuits and/or systems that can reflect incident signals, such as RF signals, back to the space for communication purposes. Such devices, methods, circuits and systems do not re-generate signals to reduce power consumption.

Harmonic backscattering refers to devices, methods, circuits and/or systems that can upconvert the operating frequency when reflecting incident signals. Those skilled in the art can appreciate that while harmonic backscattering may be described in the context of doubling the operating frequency according to various embodiments of this description, the harmonic backscattering module or method can triple, or quadruple the operating frequency or more, depending on the specific designs and applications of the systems.

Battery-free and self-sustainable IoT or WSN devices are designed to communicate with and powered by a Simultaneous Wireless Information and Power Transfer (SWIPT) or similar transceiver which uses RF signals for both wireless information transfer (WIT) and wireless power transfer (WPT) at the same time.

Figure 1:
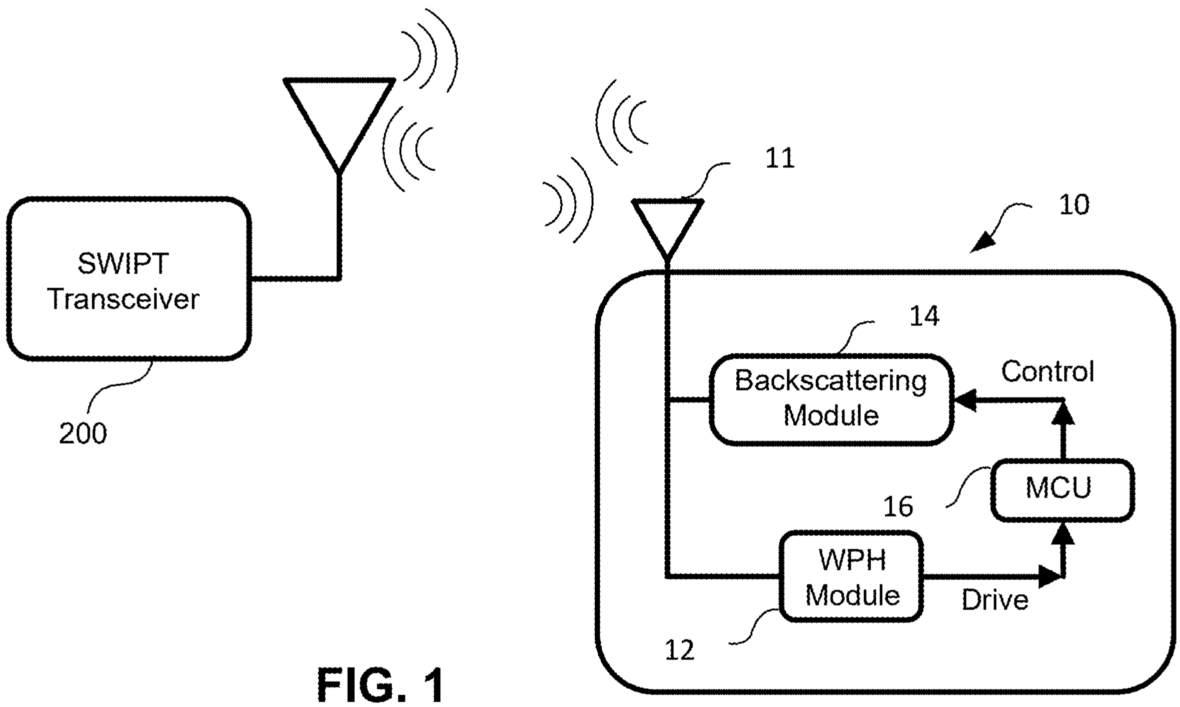
FIG. 1 (PRIOR ART)
FIG. 1 is a schematic diagram of an Internet of Things (IoT) or Wireless Sensor Network (WSN) device in communication with and is powered by a Simultaneous Wireless Information and Power Transfer (SWIPT) or similar transceiver, according to a conventional method.

Various designs for ambient backscatter transceivers have been proposed. For example, FIG. 1 illustrates an IoT or WSN device 10 interacting with a SWIPT or similar transceiver 200. The device 10 can comprise an antenna 11, a WPH module 12 and a backscattering module 14, where both the WPH module 12 and the backscattering module 14 are standalone modules. The device 10 often requires a microcontroller (MCU) 16 which can be energized by the WPH module 12 to control the backscattering communication with the SWIPT or similar transceiver 200, or other distributed devices (not shown). Such IoT or WSN device 10 may receive RF power and convert them into DC to drive the entire device 10 or may rely on additional energy sources, such as solar, mechanical, or thermal sources to power the various components.

Conventional devices and methods primarily realize WPH or backscattering as standalone functions. When integrated into a single platform, WPH and backscattering functions are often implemented by separate modules, which can result in a complicated design, a large volume factor, as well as high power consumption. Controlling the operations of WPH and backscattering typically relies on a separate MCU 16, which consumes additional power.

These designs often employ a WPH module 12 to collect RF energy or other types of energy (such as solar, thermal, mechanical energy or the like) in order to power backscattering communications, MCUs 16, and/or sensors (not shown). As a self-sustainable platform, more separate modules involving active components can translate into more losses, resulting in a more power-hungry platform.

Backscattering communications are realized by reflecting incident RF signals to the transceiver 200. As backscattering signals have the same frequency as the incident ones, which can cause self-jamming problems. Thus, to avoid such problems, various devices and methods may introduce extra modules and energy to shift backscattering RF signals to other frequency bands. One example of a frequency-shifted backscattering device uses a ring oscillator to move the frequency of reflected signals to another frequency band, different from that of the incoming ones. Another example of a frequency-shifted backscattering device uses a mixer to shift backscattering signals.

Some backscattering devices therefore may incorporate complex MCU system architecture for operations. Complex system structure can add extra burden to the designs, overall power consumption, and/or cost.

Figure 2:
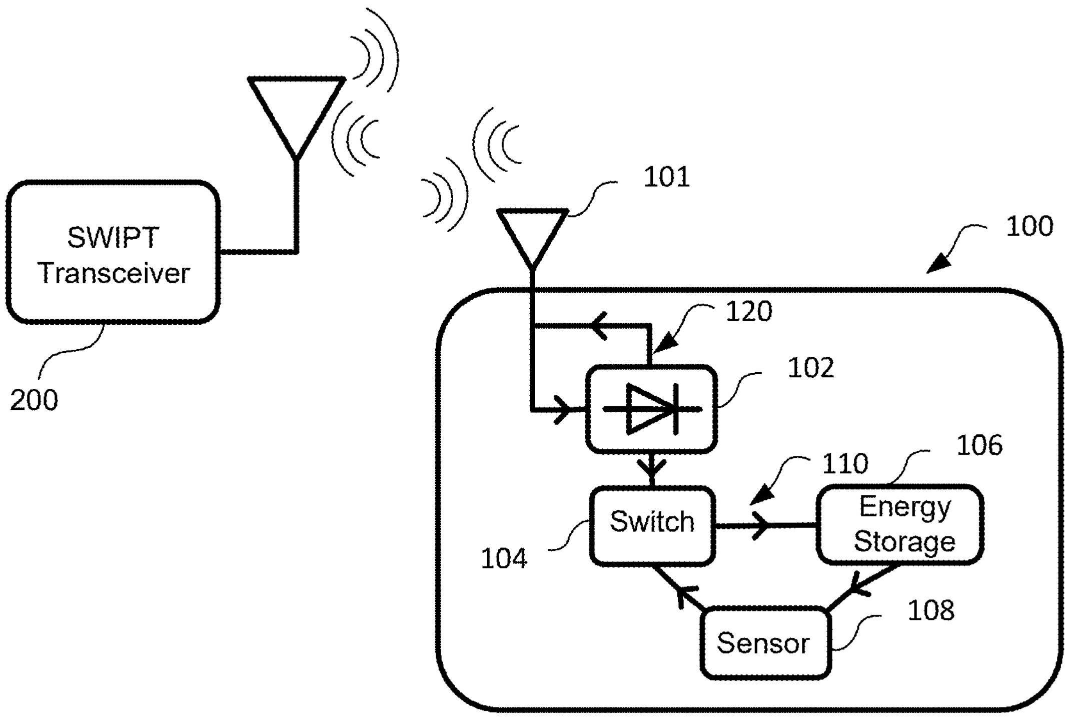
FIG. 2 is a schematic diagram of a backscattering device in communication with and is powered by a SWIPT or similar transceiver, according to some examples of this disclosure.

Turning now to FIG. 2, a self-adaptive backscattering device 100 according to some examples of this disclosure is shown. The self-adaptive backscattering device 100 can be wirelessly powered by the SWIPT or similar transceivers 200 and communicate with the SWIPT or similar transceivers 200 using backscattering technology, such as harmonic backscattering (HB) technology. The backscattering device 100 is suitable for use as an IoT, WSN, or similar distributed device. As will be explained below, the backscattering device 100 is self-adaptive and can be battery-free.

In the embodiment as shown in FIG. 2, the device 100 comprises an antenna 101, a non-linear element 102, and a switch 104. The antenna 101 can comprise any suitable structure for receiving and transmitting RF signals. The antenna 101 is adapted to communicate with the SWIPT or similar transceivers 200, or other distributed devices. The non-linear element 102 can be operably coupled to the antenna 101. In one implementation, the non-linear element 102 may comprise a single diode. The switch 104 operably couples the non-linear element 102 to a WPH load or energy storage 106. The WPH load or energy storage 106 is adapted to accumulate DC energy or power harvested from incident RF signals. One non-limiting example of the energy storage 106 comprises a super capacitor.

As will be explained in more details below, the device 100 can self-adaptively turn on and off the switch 104 based on the harvested DC energy, alternating between a WPH mode and a backscattering mode. In particular, when the switch 104 is on (by default), the non-linear element 102 is connected to the energy storage 106 and the device 100 operates in a WPH mode for harvesting or otherwise converting RF signals incident on the antenna 101 to DC energy. This path of connecting the non-linear element 102 to the energy storage 106 or WPH load is generally denoted as path 110 (as shown in FIG. 2), and can be referred to as the WPH path. When the switch 104 is off, the device 100 switches from the WPH mode to the backscattering mode for transmitting backscattered RF signals (such as harmonic backscattered RF signals) through the antenna 101. The path of returning incident RF signals through the non-linear element 102 is generally denoted as path 120 (as shown in FIG. 2), and can be referred to as the backscattering path, or in some examples, the HB path.

The device 100 may further comprise one or more sensors 108. The energy storage 106 can use the accumulated energy or power to turn on and off the sensor 108, which in turn controls the switch 104 to transmit sensor information through the backscattering RF signals. In other words, the device 100 can return sensor information for use of the SWIPT or similar transceivers 200, or other distributed devices, using backscattering technology.

For example, the sensor 108 can start functioning when the harvested DC energy in the WPH mode reaches a sensor threshold. The sensor 108 can be adapted to convert the sensor information into high and low bias voltages to switch off and on the switch 104. In one non-limiting implementation, the sensor information can be converted into high and low bias voltage using ON-OFF Keying (OOK) modulation. The sensor information can therefore be carried in the backscattered RF signals and transmitted through the antenna 101.

In an alternative embodiment, the one or more sensors 108 may be loaded on the antenna 101 and may not be energy driven. The sensor information can be converted into a frequency shift of the backscattering signals (e.g., harmonic backscattering) in the backscattering mode. For example, when a temperature sensor (not shown) is loaded on the antenna 101, temperature variations can change the resonant frequency of the antenna 101 and further result in a backscattering component (e.g., second harmonic component) with a frequency shift. Based on the frequency shift, the receiving end can detect the temperature information. The sensor information can therefore be carried in the frequency shift of the backscattered RF signals and transmitted through the antenna 101.

Figure 3:
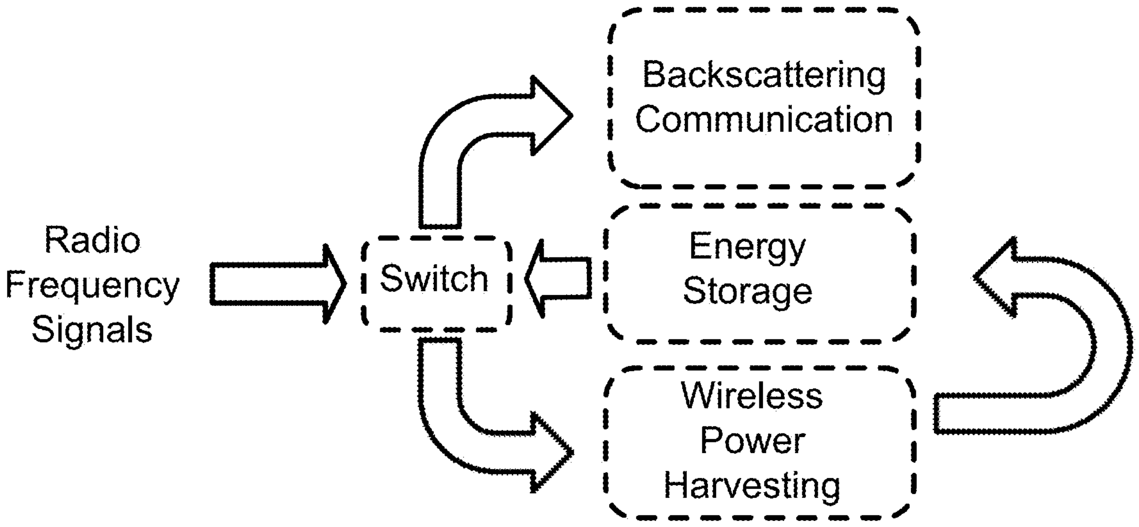
FIG. 3 is a schematic diagram showing functional elements of the device, according to some examples of this disclosure.

FIG. 3 illustrates functional elements of the self-adaptive backscattering device 100, according to some examples of this disclosure. In operation, a SWIPT or similar transceiver 200 can send RF signals to the device 100. As described above, the RF signals transmitted by the transceiver 200 can be (1) delivering power to the device 100 through path 110 (i.e., WPH mode) and (2) backscattered by the device 100 later for sending sensor information wirelessly through path 120 (i.e., backscattering communications mode). In some implementations, the backscattered RF signals can be upconverted to harmonic components. In these embodiments, the backscattering communications mode is also referred to as HB communications mode.

As shown in FIG. 3, the device 100 operates in either WPH or backscattering communication modes, determined by the status of the switch 102. According to various embodiments of the disclosure, the switch 102 can be controlled directly or indirectly by the accumulated DC energy or power, making the device a battery-free stand-alone system.

During operation and with reference to FIG. 2, the switch 104 is normally turned on and the device initially operates in the WPH mode. When accumulated DC voltage increases and reaches a first level (e.g., logic high bias), the switch 104 is turned off which effectively switches the device 100 from the WPH mode to the backscattering communications mode and the accumulated DC energy and voltage in turn starts to decrease. When the accumulated DC energy is consumed by the backscattering communication, the DC voltage would reduce and reach a second level (e.g., logic low bias), the switch 104 is switched back on and the device 100 operates in the WPH mode again. The device 100 can therefore realize the switching of the operations between WPH and backscattering communications modes in a self-adaptive and periodic manner.

Figure 4:
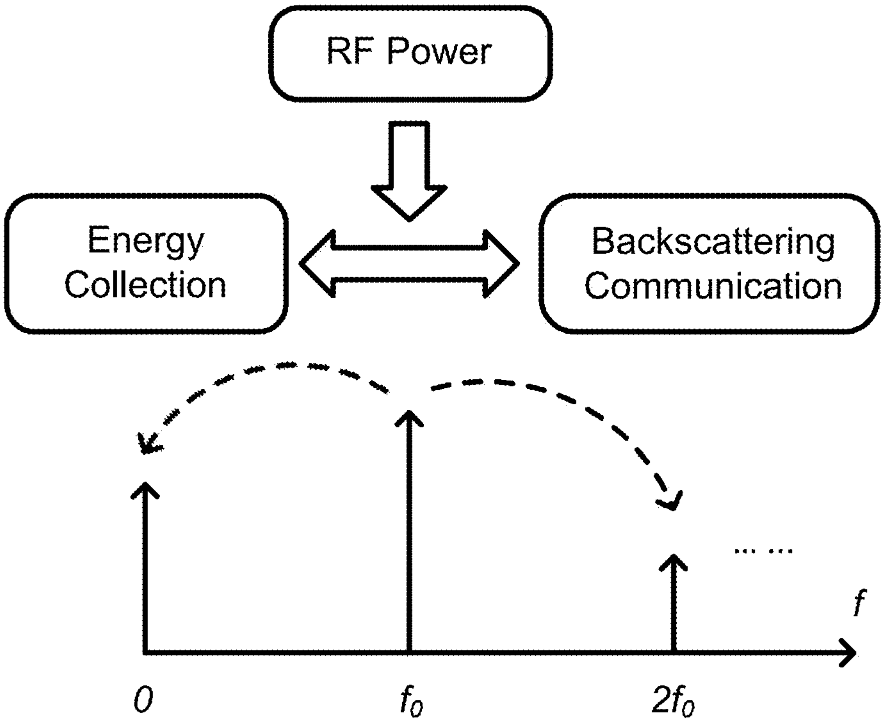
FIG. 4 is a schematic diagram of two different ways of using radio frequency (RF) power by the device in reference to the frequency domain, according to some examples of this disclosure.

FIG. 4 shows the two different ways of using RF power by the device 100: WPH and HB communications. When receiving RF signals from a SWIPT or similar transceiver 200, the received RF signals can be utilized in two possible ways. One is being converted into DC energy (i.e., WPH mode) and the other one can be upconverted into second harmonic component (i.e., HB mode). In the WPH mode, RF signals are converted at $f_0$ to DC (0 Hz), $f_0$ being the fundamental frequency of the received RF signals; and in the HB mode, the RF signals can be upconverted to $2f_0$, as shown in FIG. 4. When the received RF signals pass the nonlinear element 102, two possibilities emerge, going through the WPH path 110 or backscattering path 120. In this exemplary embodiment, the backscattering communication is transmitted at $2f_0$. However, those skilled in the art would appreciate that the harmonic backscattering module can triple, or quadruple the operating frequency or more, depending on the specific designs and applications of the system.

Figure 5:
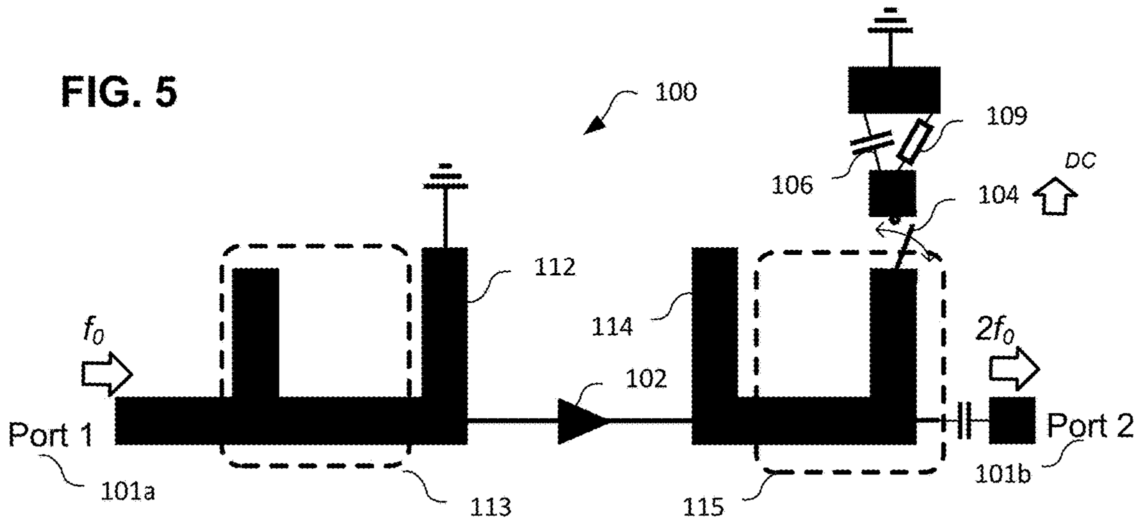
FIG. 5 is a schematic diagram of a single-ended device, according to one embodiment of this disclosure, showing various components of the device which can self-adaptatively turn on and off the switch.

FIG. 5 is a schematic diagram of a single-ended backscattering device 100, according to an exemplary embodiment of this disclosure. According to this embodiment, the backscattering device 100 comprises a first port 101*a* for receiving RF signals at a fundamental frequency $f_0$ and a second port 101*b* for transmitting backscattered RF signals. In accordance with this embodiment, the backscattered RF signals can be transmitted at an upconverted frequency of $2f_0$. The device 100 comprises a non-linear element 102 (including but not limited to a diode), operably coupled to the first port 101*a* and the second port 101*b*. The non-linear element 102 allows the current to flow in one direction from the first port 101*a* (input) generally to the second port 101*b* (output).

According to this embodiment, the device 100 can further comprise two quarter-wavelength stubs 112, 114 for maximizing power conversion from $f_0$ to $2f_0$, and input and output matching networks 113, 115 for maximum power transfer at $f_0$ and $2f_0$, respectively.

The non-linear element 102 sits in the middle of the device 100 and is coupled to the first and second ports 101*a*, 101*b* through the two quarter-wavelength stubs 112, 114. These two quarter-wavelength stubs 112, 114 help maximize power conversion (i.e., increasing conversion efficiency) from fundamental RF $f_0$ to its second harmonic component $2f_0$ in the harmonic communication mode. The quarter-wavelength stub 112 at an input side of the non-linear element 102 is a short stub (i.e., short-circuited at its free end), and the quarter-wavelength stub 114 at an output side of the non-linear element 102 is an open stub (i.e., left open at its free end).

The input and output matching networks 113, 115 are designed for impedance matching. The input and output matching networks 113, 115 can each comprise an open stub. In particular, the input matching network 113 is configured to allow more incident RF signals to pass which can maximize input power transfer of incident RF signals at $f_0$ for both WPH and backscattering communications modes. The output matching network 115 is configured to allow more generated second harmonic component to pass which can maximize power transfer of the second harmonic component $2f_0$ for the backscattering communications mode.

The non-linear element 102 is also operably coupled to a WPH load 109 through a switch 104 for the operation change between WPH and backscattering communications modes. The switch 104 is placed at the end of the output matching network's open stub 115, as shown in FIG. 5.

Figure 6:
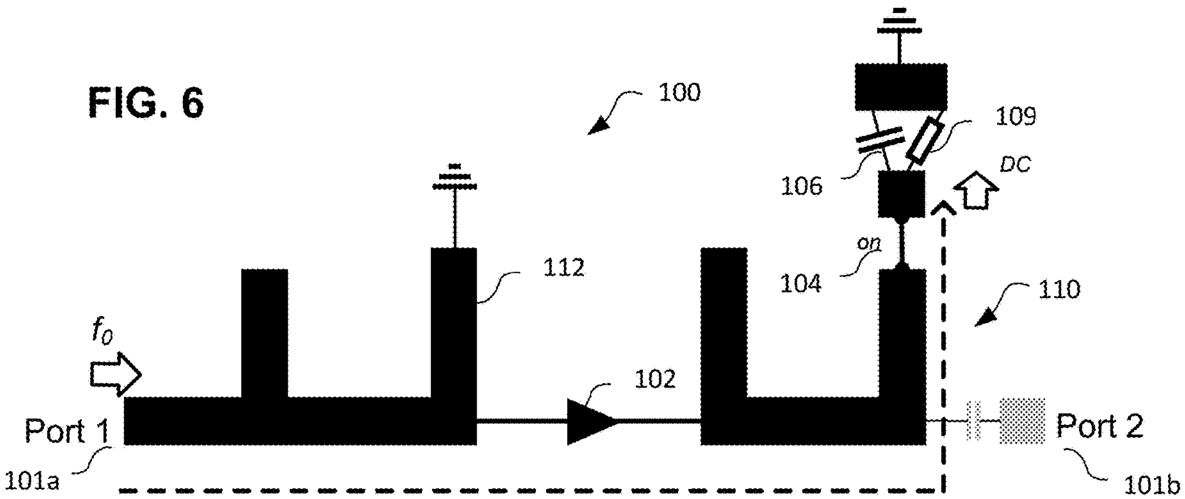
FIG. 6 is a schematic diagram of the device as shown in FIG. 5, when the switch is on and the device operates in a wireless power harvesting (WPH) mode.

When the switch 104 is on, the WPH load 109 is connected to the device, as illustrated in FIG. 6. The device 100 operates in the WPH mode and harvests RF power from the incident RF signals. Reference character 110 and the dotted line in FIG. 6 are used to demonstrate the path of the RF signals in this mode. The RF signals generally seek a path of the lowest impedance to complete their circuit loop. The switch 104 is normally turned on, thereby establishing a ground path for RF. As shown in FIG. 5, the quarter-wavelength stub 112 and the WPH load are connected to the ground. In the WPH mode, all fundamental and higher harmonic components are grounded due to a filtering capacitance 106 at the WPH load. Little second harmonic signal should be generated at the second port 101*b*. Instead, DC energy and voltage accumulate across the load resistance 109 through path 110. This harvested DC energy or power are then used to turn the switch 104 off (disconnected from the WPH load), as will be explained in more detail below.

Figure 7:
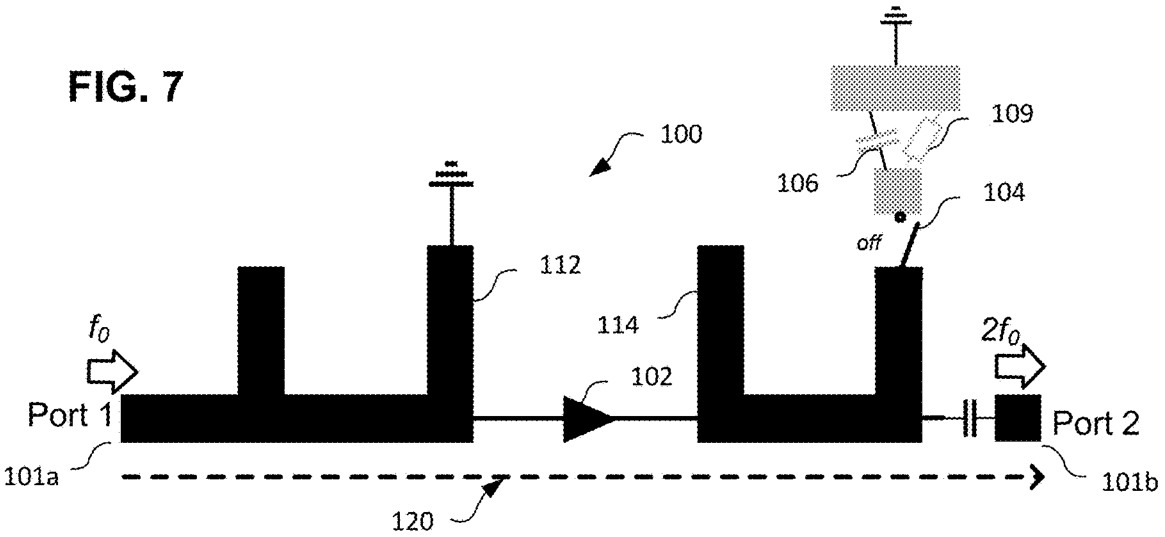
FIG. 7 is a schematic diagram of the device as shown in FIG. 5, when the switch is off and the device operates in a harmonic backscattering (HB) communications mode.

When the switch 104 is off, the device 100 is disconnected from the WPH load 109, as illustrated in FIG. 7. When the switch is turned off, the device 100 switches from the WPH mode to the backscattering communications mode, where the device generates and sends out the second harmonic component at the output port (port 2) 101*b*.

According to this embodiment, the non-linear element 102 provides rectification through a single diode. Those skilled in the art can appreciate that other types of non-linear element or more than one nonlinear element may be used in the circuits for rectification, depending on the specific application and/or tolerance of conversion loss. For example, the non-linear element 102 can comprise other types of diode, more than one diode, a bridge rectifier, a transistor, or the like.

Figure 8:
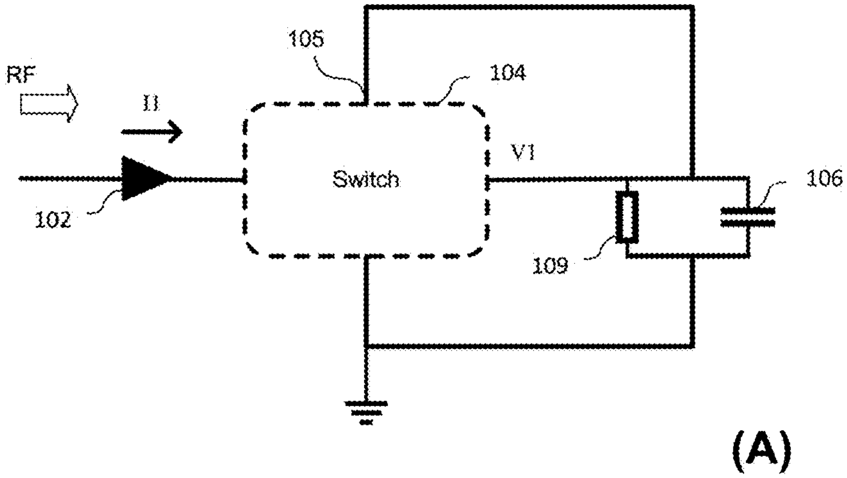
FIG. 8 is a simplified schematic diagram of the device as shown in FIGS. 5-7, to illustrate the operation of the switch controlled by the harvested energy of the non-linear element.

FIG. 8 provides a simplified schematic diagram of the device 100 as shown in FIGS. 5-7 to verify the operation of the switch 104 controlled by the harvested energy of the non-linear element 102. Simulation results of the capacitor voltage V1 and the current I1 through the non-linear element marked in FIG. 8 are provided in FIGS. 9A and 9B, respectively.

In this exemplary example, the non-linear element 102 adopts a single Schottky diode for power conversion; and the switch 104 may use a normally-on Single Pole, Single Throw (SPST) switch. As shown in FIG. 8, the switch 104 is placed between the non-linear element 102 and its WPH load 109. The harvested DC energy or voltage by the non-linear element 102 is applied as a logic input 105 of the switch 104. For the purposes of this exemplary example, the load resistance can selected as 10 kΩ and the filtering capacitance as 10 nF. Since the switch is normally on, the device initially works in the WPH mode.

Figure 9:
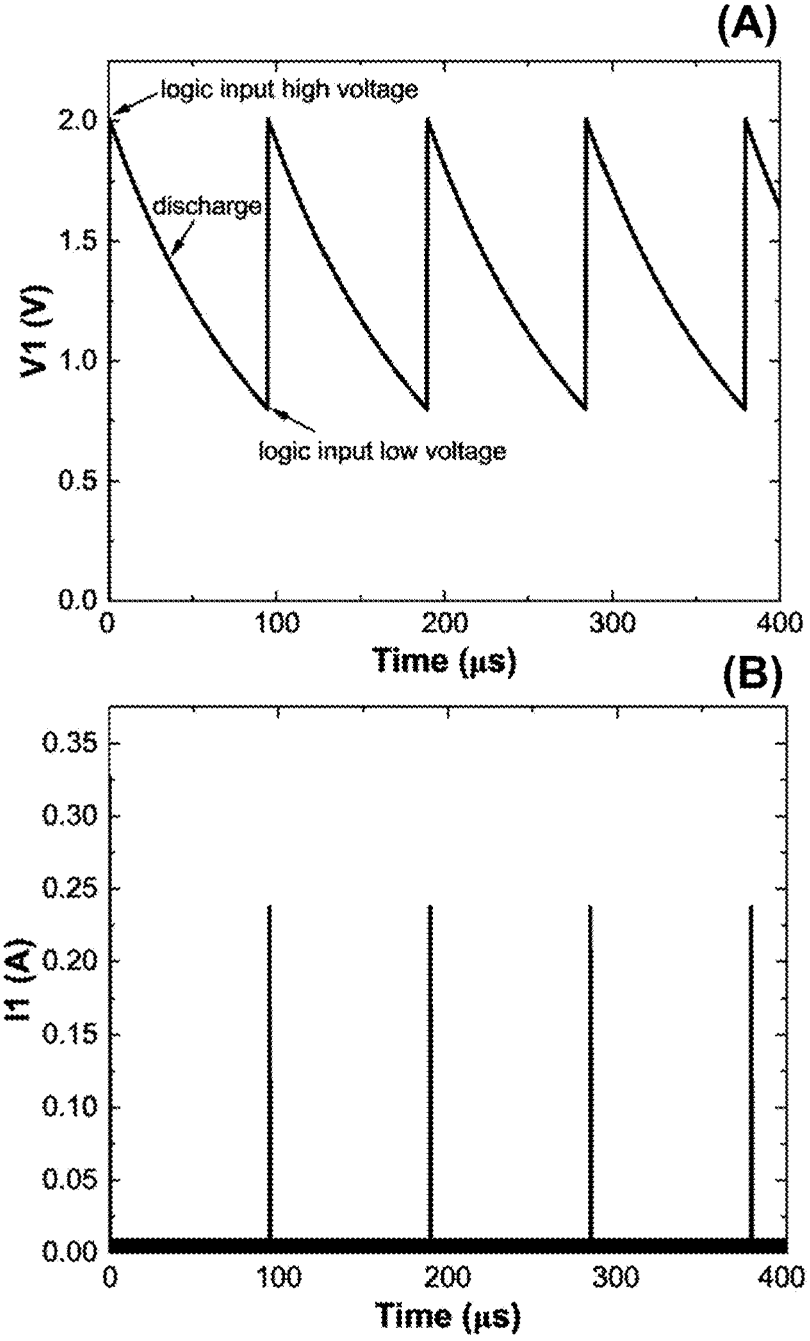
FIG. 9(A) shows simulated results of the capacitor voltage V1 and FIG. 9(B) shows simulated results of the current I1 through the non-linear element.

The voltage at V1 and current I1 through the non-linear element 102 (marked in FIG. 8) are presented in FIG. 9. The initial charging process of the filtering capacitance is relatively fast as the capacitance used in this example is small. Once the voltage V1 across the capacitance reaches a first level (e.g., a logic high voltage) to turn off the switch 104, the connection between the non-linear element 102 and the WPH load is dislodged, revealed by the sudden decrease of I1. This indicates that the non-linear element 102 is functioning in the backscattering communications mode if a proper backscattering output is connected to the non-linear element 102, as shown in FIG. 7. Also, the capacitance begins the discharge process as indicated by V1 in FIG. 9A. Once the voltage V1 across the capacitance reduces to a second level (e.g., a logic low voltage) to turn on the switch 104 again, the WPH process resumes, and I1 jumps. The switch 104 thereby enables the device 100 to cycle and alternate between WPH and backscattering communications modes.

Figure 10:
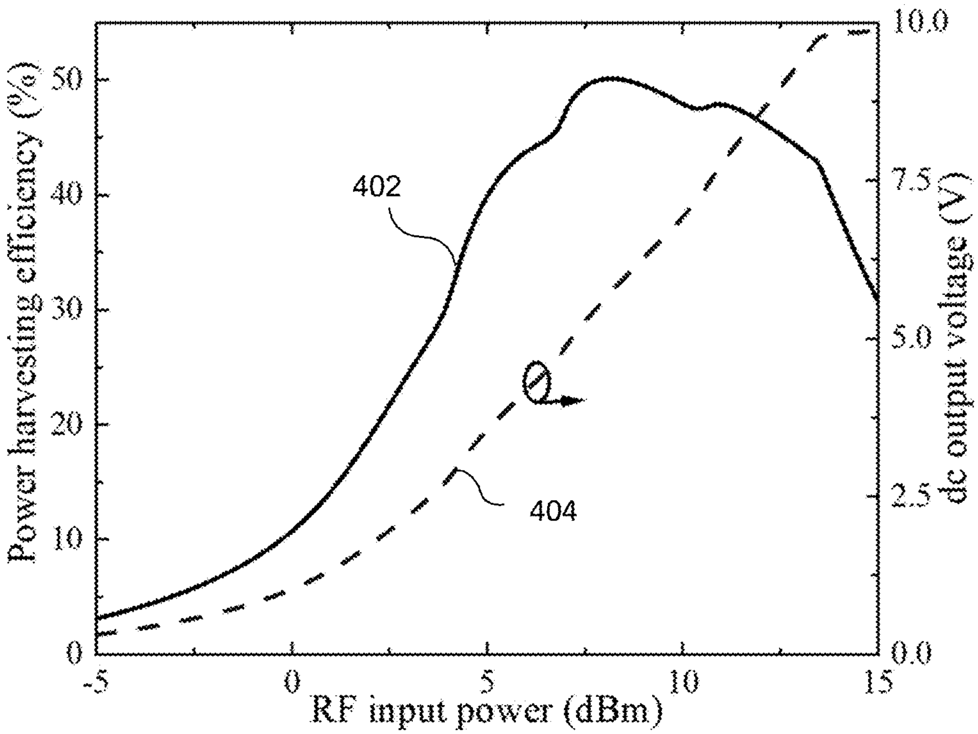
FIG. 10 shows schematic simulation results of power harvesting efficiency and direct current (DC) output voltage.
Figure 11:
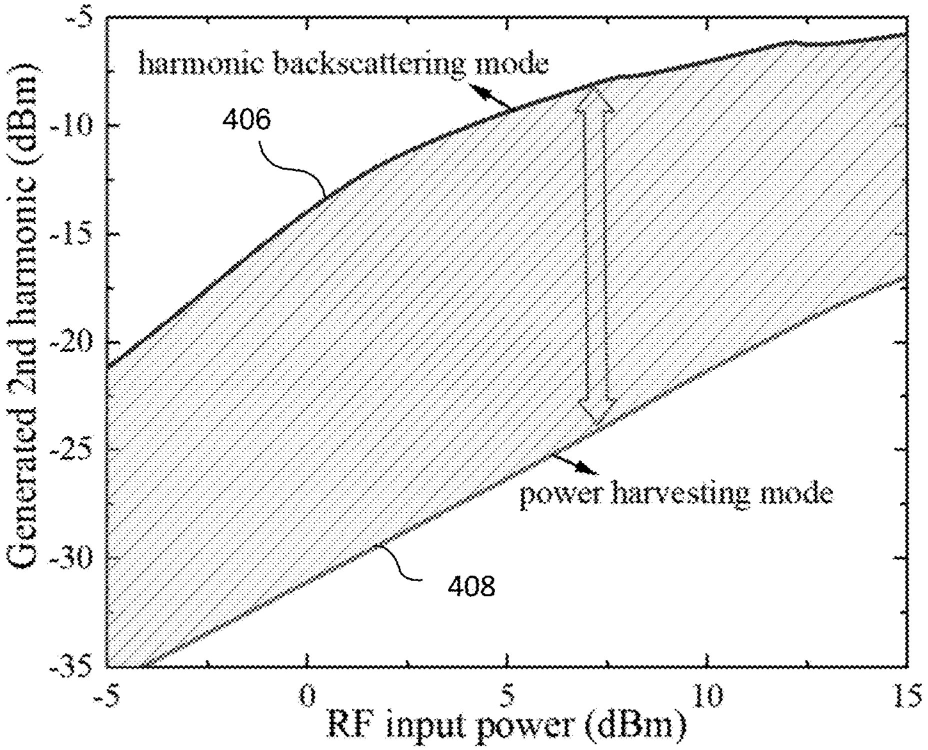
FIG. 11 shows comparison of generated second harmonic component in the WPH and HB modes.

FIG. 10 shows schematic simulation results of power harvesting efficiency (%) and DC output voltage (V). FIG. 11 shows schematic simulation results of comparison of generated second harmonic components (dBm or decibel-milliwatts) in WPH and backscattering communication modes.

In this example, the performance of WPH and backscattering communications modes is evaluated based on using a single Schottky diode as the non-linear element 102. The operating frequency can be 915 MHz, and the load resistance can be selected as 10 kΩ for the WPH load.

The power harvesting efficiency is presented in line 402 and the DC output voltage is presented in 404, both as a function of RF input power at port 1 101*a* when the WPH load 109 is connected (as shown in FIG. 6). The power harvesting efficiency 402 reaches a peak at an input power of about 8 dBm, which can correspond to the power level where impedance matching is designed and optimized. This simulated peak efficiency is about 50.08%. The DC output voltages 404 are 3.55 V and 5.62 V at 5 dBm and 8 dBm, respectively.

FIG. 11 illustrates generated second harmonic components when the switch 104 is on (WPH mode, line 408) and off (backscattering communications mode, line 406). When the switch is turned off, the device can generate 17.01 dB and 15.67 dB larger second harmonic components at port 2 at 5 dBm and 8 dBm, respectively, compared to when the switch is on.

As described in various embodiments of this disclosure, the backscattering device 100 comprises a nonlinear element 102 that can be used to realize both WPH and backscattering functions, thereby reducing the complexity of the system architecture design, as well as reducing power consumption and increasing efficiency. Because WPH and backscattering modules share most of the structure design, it can also reduce the form factor of the system.

The backscattering device 100 can further realize an HB operation of upconverting the frequency of the incident signals, which addresses the potential self-jamming problems in communications occurring frequently in conventional methods.

The backscattering device 100 can provide self-adaptive operations driven only or otherwise substantially by external RF power, making it a compact battery-free solution suitable for many different applications.

The device 100 according to various embodiments of this disclosure therefore can provide both HB and WPH functions in a low-power and energy-efficient solution and can be used for IoT and wireless sensing in smart cities, agriculture, and transportation applications. The described embodiments of a backscattering device can be used to provide a battery-free, highly compact, self-adaptive, and less complex design immune to self-jamming.

Figure 12:
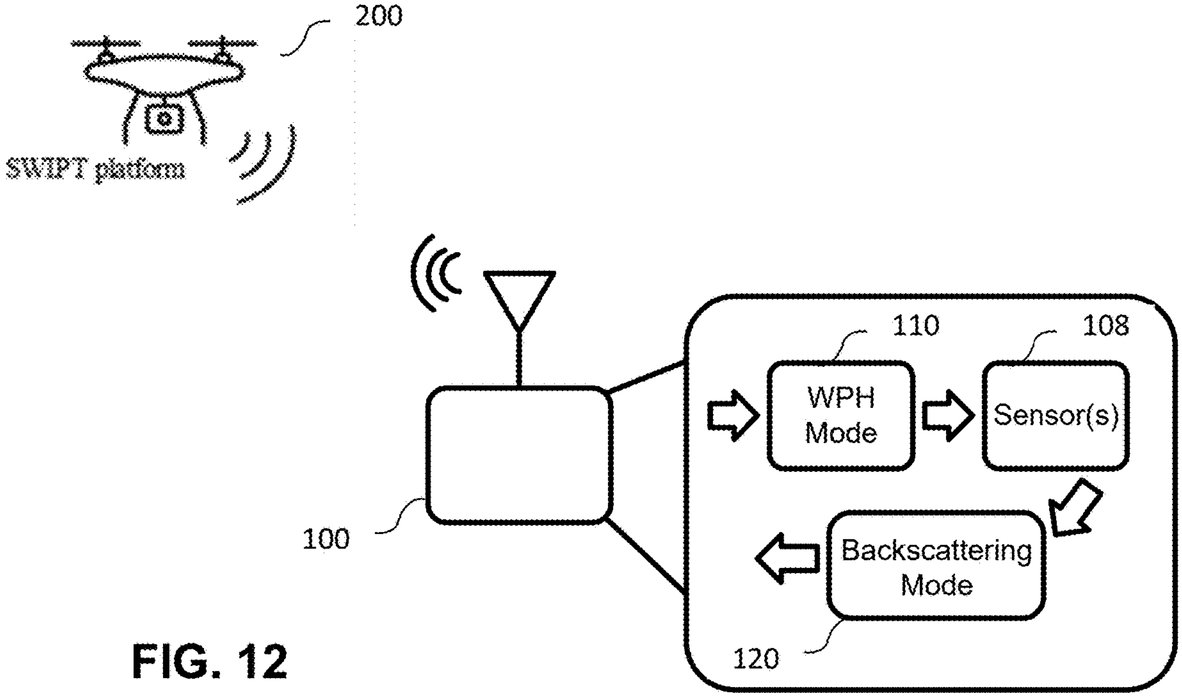
FIG. 12 is a schematic diagram illustrating an application scenario using the device according to some examples of this disclosure.

FIG. 12 shows an application scenario of using the self-adaptive backscattering device 100, in which a SWIPT transceiver platform 200 carried by a drone can power and communicate with the device 100, according to some embodiments of this disclosure.

In such applications, sensor information can be delivered to the SWIPT transceiver platform 200 through backscattering communications. Such self-adaptive backscattering devices 100 may be buried underground, placed inside concrete, or put in other hard-to-reach and/or harsh environments for wireless sensing and communications.

Figure 13:
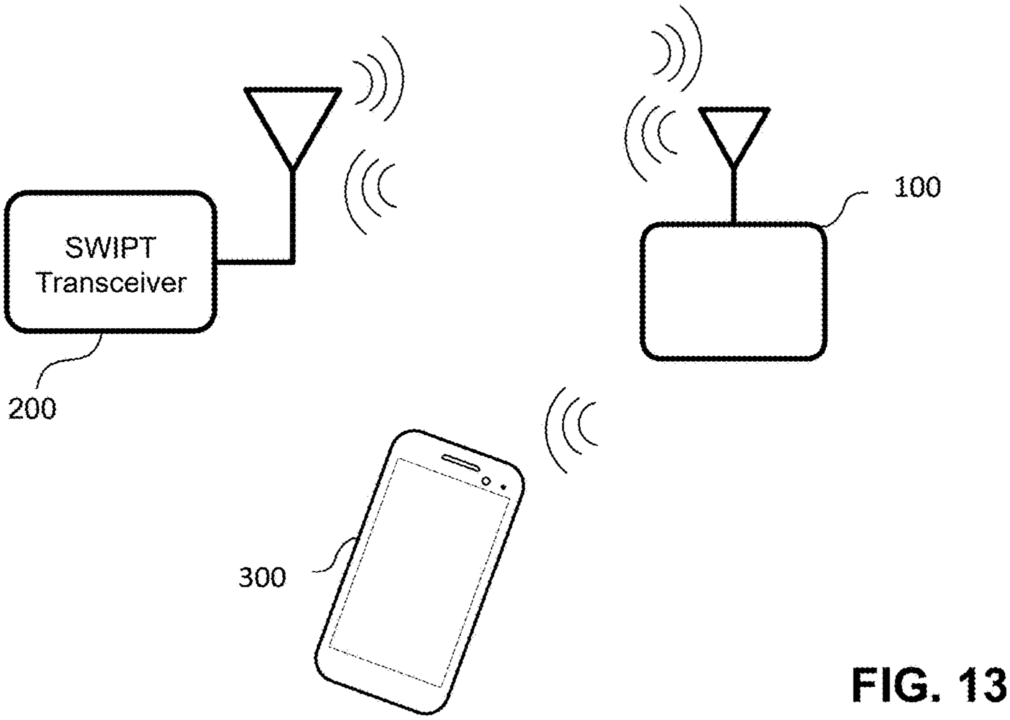
FIG. 13 is a schematic diagram illustrating another application scenario using the device according to some examples of this disclosure.

FIG. 13 shows another application scenario of using the self-adaptive backscattering device 100, in which a portable device 300 can send a request to a SWIPT or similar transceiver 200 to obtain sensor information from the device 100.

In such applications, a portable device 300 may be used to obtain sensor information from the device 100. As the portable device 300 may not be able to send continuous strong RF signals to wake up the device 100, it can send a request to the SWIPT transceiver 200, which can in response wirelessly energize the backscattering device 100. When the sensor information is sent out, the portable device 300 can be adapted to receive and decode it. Therefore, this embodiment shows another way to implement and use the device 100 for effective sensor information collection.

Figure 14:
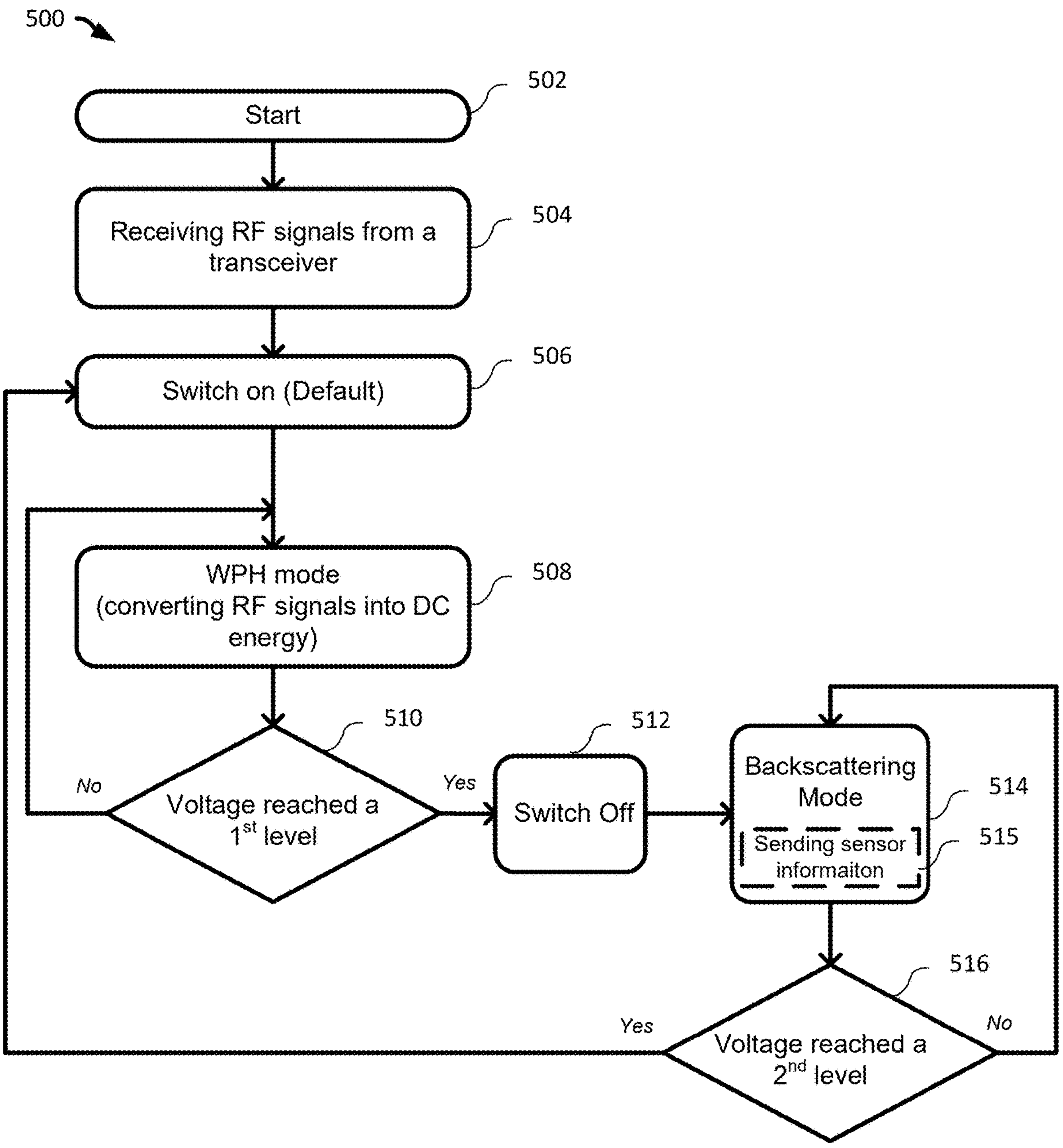
FIG. 14 is a flowchart showing steps of a battery-free and self-adaptive communication method, according to some examples of this disclosure.

FIG. 14 is a flowchart showing steps of a self-adaptive communication method, according to some embodiments of this disclosure.

The method starts at step 502 and when RF signals are received at step 504 from a transceiver, such as a SWIPT or similar transceiver 200. By default, the switch 104 is connected to a WPH load and turned on at step 506. The method 500 comprises step 508 of converting the RF signals into DC energy in a WPH mode via a non-linear element 102, including but not limited to a diode.

The method 500 will continue to operate in the WPH mode until when harvested or accumulated DC voltage V1 reaches a first level (e.g., a logic high bias) at step 510. When accumulated DC voltage increases and reaches the first level, the switch 104 can be turned off at step 512 and the method 500 automatically switches from the WPH mode to the backscattering communications mode at step 514 for generating backscattering RF signals (such as harmonic backscattering signals). The capacitance thereby begins the discharge process, and the method 500 will continue to operate in the backscattering communications mode until when voltage V1 decreases and reaches a second level (e.g., a logic low bias) at step 516. When the voltage V1 across the capacitance reduces to the second level, the switch 104 can be turned on again and the method 500 operates back in the WPH mode.

The method 500 can be used to incorporate transmission of sensor information at step 515 in the backscattering communications mode. For example, in the backscattering communications mode, sensor information (such as temperature information) can be converted into a frequency shift of the backscattering signals. In particular, the sensor information can be used to change the frequency of the backscattering RF signals, such as the second harmonic component. Based on the frequency change, the receiving end (e.g., the SWIPT or similar transceiver, the portable device, or the like) can detect the sensor information.

Figure 15:
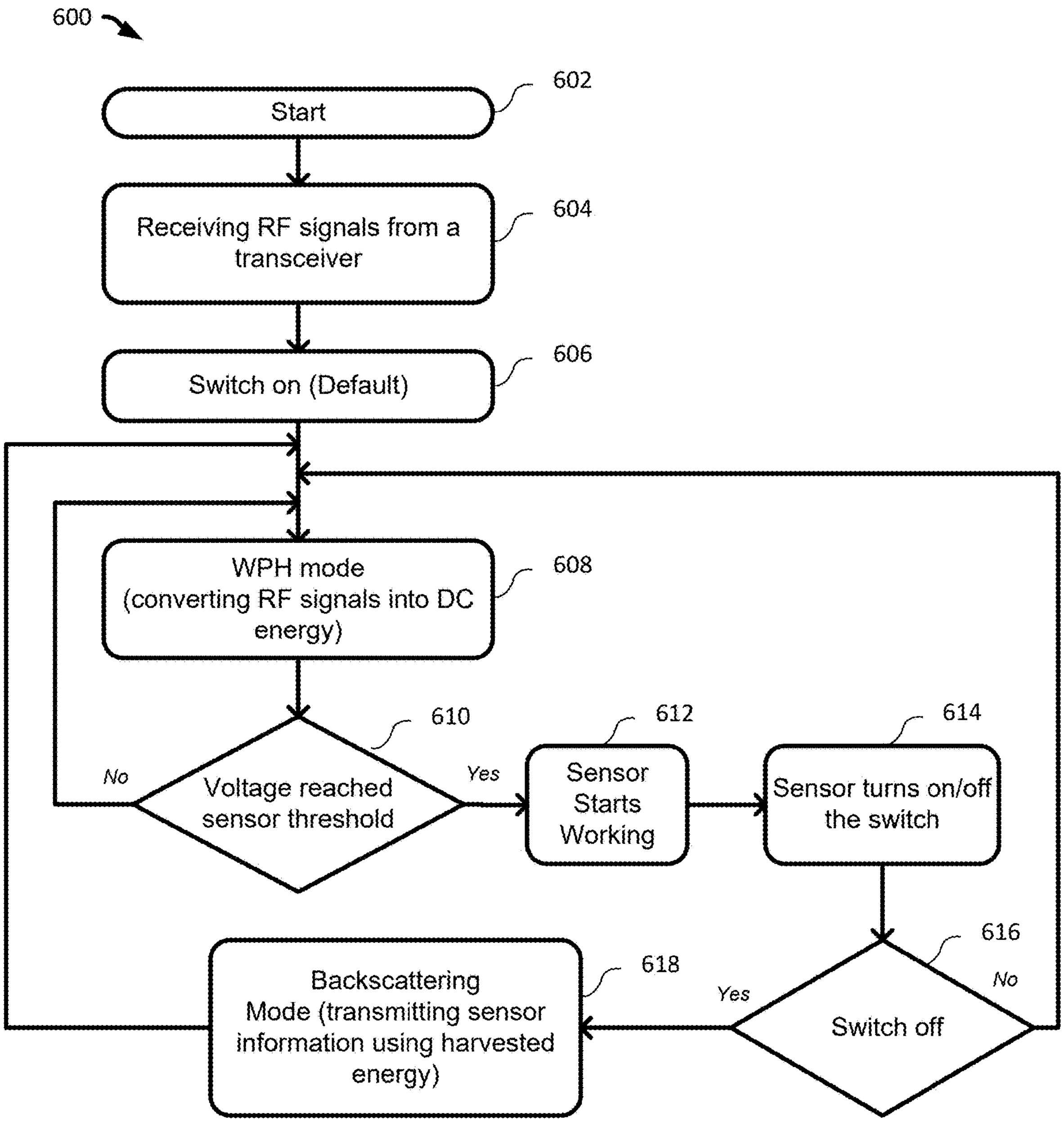
FIG. 15 is a flowchart showing steps of a battery-free and self-adaptive communication method, according to some examples of this disclosure.

FIG. 15 is a flowchart showing steps of a battery-free and self-adaptive communication method 600 according to some alternative embodiments, where sensor information can be transmitted using the backscattering RF signals.

The method starts at step 602 and when RF signals are received at step 604 from a transceiver, such as a SWIPT or similar transceiver 200. Like FIG. 14, the switch 104 is normally turned on at step 606, which means that a ground path for RF is established. Thus, when the switch 104 is on, the WPH path 110 can be enabled, and RF signals start to be converted into DC energy via the nonlinear element 102 in the WPH mode at step 608. The harvested DC energy may be accumulated in an energy storage (such as a supercapacitor), as shown in FIG. 1.

In accordance with this embodiment, the method 600 will continue to operate in the WPH mode until when the voltage of the energy storage reaches a sensor threshold to trigger an attached sensor application. When the sensor threshold is reached at step 610, the sensor 108 can start working at step 612. The sensor 612 is adapted to collect information and convert it into high and low bias voltages for the switch 104 at step 614. When there is a high bias voltage, the switch can be turned off at step 616, resulting in the WPH path 110 becoming open and no RF signals going through the path 110. In this case, RF signals are directed to the backscattering path 120 and the backscattering signals (such as second harmonic signals) are generated and sent out by the antenna 101 at step 618. The sensor information can therefore be carried by the backscattering RF signals and transmitted using the harvested energy.

Figure 16:
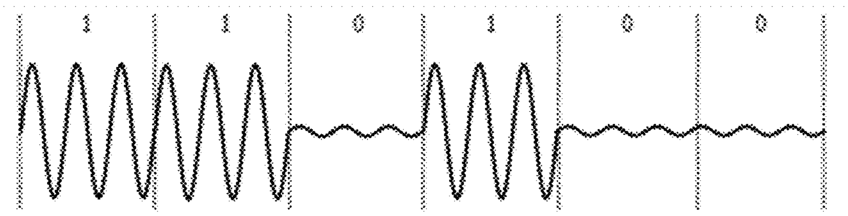
FIG. 16 shows an example waveform of generated second harmonic signals and corresponding binary data, which are used for transmitting sensor information.

FIG. 16 provides an example of a waveform of generated second harmonic signals using the method of FIG. 15 and their corresponding binary data, for transmitting the sensor information.

The generated second harmonic signals may have a waveform, as shown in FIG. 16. This example uses OOK modulation to transmit the sensor information. The SWIPT or similar transceiver 200 can be adapted to demodulate the second harmonic signals to decode the sensor information. Those skilled in the art would appreciate that other modulation methods can be used for modulating the backscattering RF signals and for transmitting the sensor information.

Figure 17:
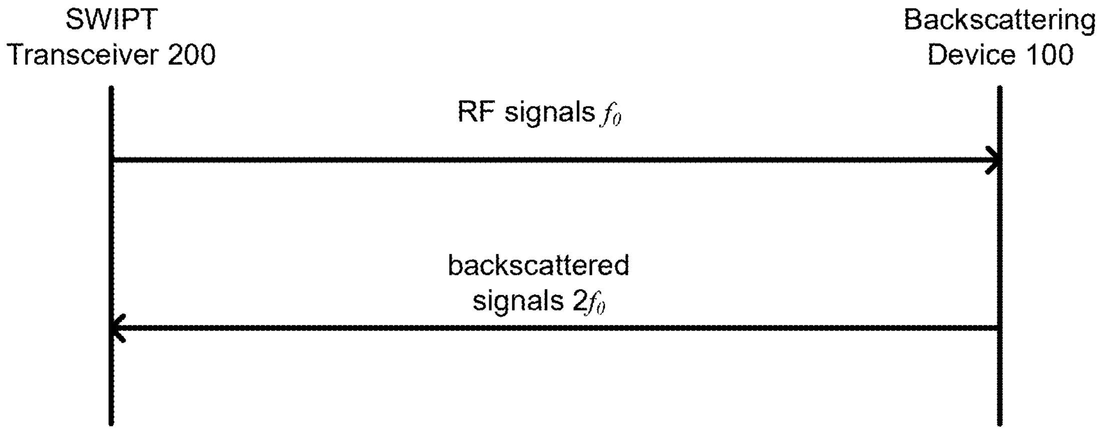
FIG. 17 is a flowchart showing communications between a SWIPT or similar transceiver and the device, according to some examples of this disclosure.

FIG. 17 is a flowchart showing communications between a SWIPT or similar transceiver 200 and a self-adaptive backscattering device 100, according to some embodiments of this disclosure. The backscattering device 100 receives RF signals with a fundamental frequency of $f_0$ from the SWIPT or similar transceiver 200 and returns backscattered signal. The backscattered signals can be harmonic backscattering components with for example, an upconverted frequency of $2f_0$. As described with reference to various embodiments above, the backscattered signals may carry sensor information and the SWIPT or similar transceiver 200 can be adapted to demodulate the signals to obtain the sensor information.

Figure 18:
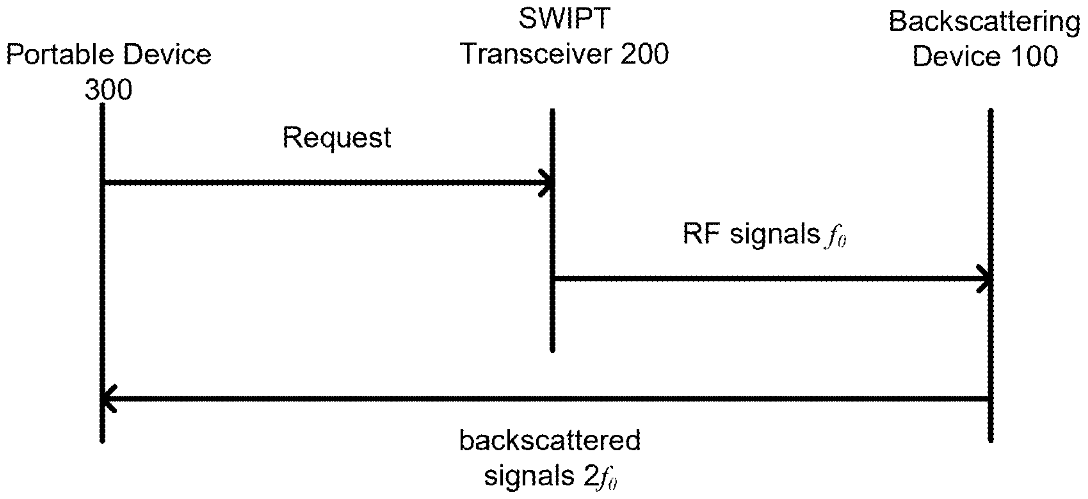
FIG. 18 is a flowchart showing communications between a portable device, a SWIPT or similar transceiver, and the device, according to some examples of this disclosure.

FIG. 18 is a flowchart showing communications between a portable device 300, a SWIPT or similar transceiver 200, and a self-adaptive backscattering device 100, according to some embodiments of this disclosure.

In accordance with these embodiments, the backscattering device 100 can receive RF signals from the SWIPT or similar transceiver 200 in response to a request sent from the portable device 300. The portable device 300 can be adapted to receive the backscattered signals from the backscattering device 100 and demodulate the signals to obtain any sensor information carried thereon.

According to the various embodiments of this disclosure, by realizing WPH and backscattering functions using a shared nonlinear element, nonlinear conversion loss can be reduced, which in turn can further reduce the device's energy consumption. As no extra modules may be required to generate harmonic components, the backscattering device and method according to various embodiments of this disclosure can be a highly energy-efficient and low-power solution to realize robust backscattering communications resistant to self-jamming problems. As well, because WPH and backscattering modules share most of the structure design, the entire design can be made compact and low-cost. Self-adaptive operations can be enabled by incoming RF signals only. Therefore, the design can be made less complex and energy efficient.

The devices and methods according to the various embodiments of this disclosure are therefore suitable for battery-free wireless communications or sensing platforms for IoT and WSN applications, such as low-duty-cycle communications or sensing applications.

Although embodiments have been described above with reference to the accompanying drawings, those of skill in the art will appreciate that variations and modifications may be made without departing from the scope thereof as defined by the appended claims.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g., "such as") is intended merely to better illustrate or describe embodiments of the invention and is not intended to limit the scope of the invention unless otherwise claimed.

What is claimed is:

1. A self-adaptive backscattering device, comprising:
an antenna for receiving and transmitting radio frequency (RF) signals;
a non-linear element coupled to the antenna; and
a switch for operably coupling the non-linear element to a wireless power harvesting (WPH) load, wherein
when the switch is on, the non-linear element is connected to the WPH load for harvesting RF signals incident on the antenna to direct current (DC) energy in a WPH mode;
when the switch is off, the device switches from the WPH mode to a harmonic backscattering (HB) mode for transmitting harmonic backscattered RF signals through the antenna, and
the switch self-adaptively switches between on and off based on harvested DC energy, wherein
the switch is turned off when the harvested DC energy in the WPH mode increases to a first level; and
the switch is turned on when the harvested DC energy decreases to a second level,
wherein the first level corresponds to a logic high bias of the switch; and the second level corresponds to a logic low bias of the switch.

2. The device according to claim 1, further comprising:

an energy storage for storing the harvested DC energy; and at least one sensor powered by the energy storage for generating sensor information.

3. The device according to claim 2, wherein:

the at least one sensor starts functioning when the harvested DC energy in the WPH mode reaches a sensor threshold;

the sensor is adapted to convert the sensor information into high and low bias voltages to turn off and on the switch; and the antenna is adapted to transmit the backscattered RF signals carrying the sensor information.

4. The device according to claim 3, wherein the sensor information is converted into high and low bias voltages using ON-OFF Keying (OOK) modulation.

5. The device according to claim 1, further comprising:

an input matching network and an output matching network, wherein the input matching network is adapted to maximize input power transfer of the incident RF signals at $f_0$, and the output matching network is adapted to maximize output power transfer of the harmonic backscattered RF signals at $2f_0$ in the HB mode.

6. The device according to claim 1, further comprising two quarter-wavelength stubs each connected to an end of the non-linear element for maximizing harmonic backscattering of the incident RF signals, wherein the two quarter-wavelength stubs are adapted to maximize the power conversion from the incident RF signals of $f_0$ to the harmonic backscattered RF signal of $2f_0$.

7. The device according to claim 1, further comprising a filtering capacitance connected to the WPH load for grounding fundamental and higher harmonic RF signals in the WPH mode.

8. The device according to claim 1, wherein the non-linear element comprises a single Schottky diode.

9. The device according to claim 1, wherein the switch is a Single Pole, Single Throw (SPST) switch and the device initially operates in the WPH mode.

10. A self-adaptive method of wireless power harvesting (WPH) and harmonic backscattering (HB) communications, comprising:

receiving radio frequency (RF) signals from a transceiver;

converting the RF signals into direct current (DC) energy in a WPH mode via a non-linear element; and automatically switching from the WPH mode to a HB communications mode for generating harmonic backscattered RF signals via the non-linear element, based on the converted DC energy, wherein said automatically switching from the WPH mode to the HB mode comprises automatically switching from the WPH mode to the HB mode when the converted DC energy increases to a first level; and the method further comprises automatically switching from the HB mode to the WPH mode when the converted DC energy decreases to a second level, wherein the first level corresponds to a logic high bias of the switch; and the second level corresponds to a logic low bias of the switch.

11. The method of claim 10, wherein the transceiver is a simultaneous Wireless Information and Power Transfer (SWIPT) transmitter.

12. The method of claim 10, further comprising turning on a sensor when the converted DC energy reaches a first threshold for generating sensor information.

13. The method of claim 12, further comprising converting the sensor information into high and low bias voltages for turning off and on the switch; and transmitting the harmonic backscattered RF signals carrying the sensor information.

14. The method of claim 13, wherein the sensor information is converted using ON-OFF Keying (OOK) modulation.

15. The method of claim 10, wherein said generating harmonic backscattered RF signals comprises upconverting and maximizing incident RF signals of $f_0$ into second harmonic backscattered components of $2f_0$ using the non-linear element and two quarter-wavelength stubs.

16. The method of claim 10, further comprising accumulating the converted DC energy in an energy storage.

17. The method of claim 10, wherein:

the RF signals are received in response to a request from a portable device; and the harmonic backscattered RF signals are transmitted to the portable device.

18. The method of claim 13, wherein the switch is on by default to connect to a WPH load for initially operating in the WPH mode.

* * * * *